United States Patent Office 3,660,427
Patented May 2, 1972

3,660,427
N-SULFATO-ALKYLSULFONAMIDE PHTHALO-CYANINE DYESTUFFS
Gerhard Back, Loerrach, Germany, assignor to Ciba Limited, Basel, Switzerland
No Drawing. Filed Sept. 9, 1969, Ser. No. 856,471
Claims priority, application Switzerland, Sept. 24, 1968, 14,259/68
Int. Cl. C07d 27/76
U.S. Cl. 260—314.5               9 Claims

ABSTRACT OF THE DISCLOSURE

New phthalocyanine dyestuffs containing N-sulfato-alkylsulfonamide-groups with an aryl- or aralkyl radical attached to the nitrogen atom. Valuable dyestuffs for dyeing nitrogenous textile materials pure and level shades having good general fastness properties.

---

This invention provides new phthalocyanine dyestuffs of the formula (1) 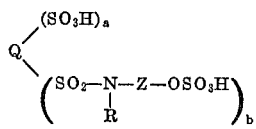

in which Q represents the residue of a phthalocyanine, Z represents ta low-molecular alkylene bridge that may be branched, for example a propylene, isopropylene or ethylene bridge, R represents an aralkyl or aryl residue that is not more than bicyclic and $a$ represents a number in the range of from 0 to 2 and in which $a+b$ must equal 4.

It provides, in particular, compounds of the formula (1a) 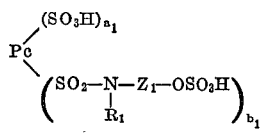

in which Pc represents the residue of a nickel-phthalocyanine, but preferably the residue of a copper-phthalocyanine, $Z_1$ represents an ethylene bridge, $R_1$ represents a benzene residue and $a_1$ represents a number in the range of from 1 to 2, especially 1, and in which $a_1+b_1$ must equal 4.

The new dyestuffs may be prepared as follows: (a) by condensing a sulphohalide, especially a sulphochloride of the formula

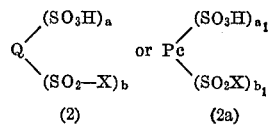

(2)                  (2a)

in which Q, $a$ and $b$ or Pc, $a_1$ and $b_1$ have the meanings given above and X represents a halogen atom, with an amine of the formula (3)   HN—Z—OSO$_3$H   or   (3a)   HN—Z$_1$—OSO$_3$H
       |                              |
       R                              R$_1$ or (b) by sulphating a compound of the formula (4) 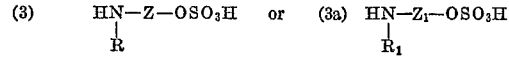 (4a)

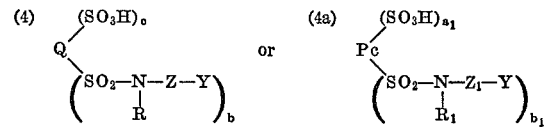

in which Q, R, Z $a$ and $b$ or Pc, R$_1$, Z$_1$, $a_1$ and $b_1$ have the meanings given above and Y represents a residue that can be replaced by a sulphato group, especially a hydroxyl group or a halogen atom.

The phthalocyanine-sulphochlorides of the Formula 2 or 2a can be obtained according to the usual methods by sulphochlorination of the corresponding phthalocyanine sulphonic acids, whereby it is easy to obtain compounds ranging up to tri- or tetra-sulphochlorides. They can also be prepared by direct sulphochlorination of the phthalocyanine.

Depending on the method of manufacture adopted, the sulphonic acid groups in the phthalocyanine molecule are situated in 4- and/or 3-position, this being dependent on whether the starting material used is 4-sulphophthalic acid or a mixture of 4-and 3-sulphophthalic acids, or whether manufacture is effected by sulphonation or direct sulphochlorination of the phthalocyanine; in the last mentioned case, all four sulphonic acid or sulphochloride groups are bound in 3-position.

The phthalocyanine-sulphohalides so obtained are condensed with the above mentioned amines of the Formula 3 or 3a in accordance with process (a) of the invention, and any sulphohalide groups that do not participate in the reaction are hydrolysed either simultaneously or subsequently; in this condensation process, the proportions used must be such that the dyestuff contains $b=4-a$ or $b'=4-a'$ sulphonamide groups per molecule. Condensation in accordance with the invention is carried out according to known methods in an aqueous medium and in the presence of an agent capable of binding acid.

Instead of using amines of the Formula 3 or 3a, condensation can also be carried out with the corresponding amines that contain, instead of the sulphato group, a residue that can be replaced by a sulphato group, especially a hydroxyl group or a halogen atom, and the condensation products so obtained are subsequently sulphated in accordance with process (b) of the invention. Amines of the kind mentioned corresponding to the formula (5)  HN—Z—Y     or     (5a)  HN—Z$_1$—Y
      |                           |
      R                           R$_1$ in which Y, R and Z or R$_1$ and Z$_1$ have the meanings given above, can be prepared, for example, by reacting a corresponding araliphatic or aromatic amine that is not more than bicyclic, especially an amine of the benzene series, with for example, chloroethanol, chloropropanol, chlorobutanol, chloroisopropanol, epichlorohydrin or ethylene oxide. The following are given as examples of araliphatic or aromatic amines: benzylamine, α- or β-naphthylamine, diphenylamine, aniline, toluidines, anisidines, nitroanilines, phenetidines, chloroanilies, bromoanilines, xylidines, 2,4-, 2,5-, 2,6- or 3,5-dimethylaniline, 2,4-, 2,5- or 3,4-dichloroaniline, 2,5-dimethoxyaniline, 2,5-diethoxyaniline, 4-methyl-2-nitroaniline, 2-methyl-4- or -5-nitroaniline, 2-methoxy-4- or -5-nitroaniline, 4-methoxy-2-nitroaniline, 4-ethoxy-2-nitroaniline, orthoethylaniline, 2-methyl-5-isopropylaniline, meta-phenoxyaniline, 2-methoxy-5 - methylaniline, 2-chloro-4-nitro aniline, 2-chloro-5-methylaniline, 3-chloro-2- or -4-methylaniline, 4-chloro-2-methylaniline, 2-bromo-4-methylaniline, 4-bromo-2-methylaniline, 4-chloro-2-nitroaniline, 5-chloro-2-methoxyaniline, 4-chloro - 2,5-dimethoxyaniline, 2,4 - dimethyl - 6 - nitroaniline and 2,4,6-trichloro- or tribromoaniline, or if desired, amines containing acidic groups imparting solubility in water, for example, para-aminobenzoic acid or metanilic acid.

The amines of the Formula 5 or 5a are first sulphated according to process (a) of the invention to form the amines of the Formula 3 or 3a, and the sulphated products so obtained are condensed with the phthalocyanine sulphochloride. Alternatively, they are first condensed with the phthalocyanine sulphochloride in accordance with process (b) and the condensation product so obtained is sulphated.

Sulphation may be carried out by known methods, for example with concentrated sulphuric acid, sulphamic acid or chlorosulphonic acid, preferably at 0 to 30° C., if desired, in an inert organic solvent, for example dimethylformamide or pyridine.

The new phthalocyanine dyestuffs obtained in accordance with the processes of the invention are suitable for dyeing and printing a very wide variety of materials, but especially nitrogenous textile materials, for example leather, silk, wool or synthetic fibres made from polyamides or polyurethanes or blends of such fibres. They are specially suitable for application in a neutral to acid medium, if desired, in the presence of an auxiliary agent, for example, a levelling agent made from a higher aliphatic amine and ethylene oxide. The dyeings and prints obtained with the new dyestuffs are distinguished by purity and levelness of shade, good fastness to light and rubbing, and fastness to alkali. In particular, they possess very good wet fatness properties, for example, fastness to washing, perspiration and milling, and they reserve well on cotton. Furthermore, the good building-up properties which the dyestuffs display on wool is an expression of the special affinity which they have for that material.

The following examples illustrate the invention, the parts and percentages being by weight.

EXAMPLE 1

60 parts of copper phthalocyanine are introduced itno 285 parts by volume of chlorosulphonic acid within 15 minutes. The batch is heated for 1 hour at 70 to 75° C. while stirring, and the temperature is then raised to 130 to 135° C. within 90 minutes. The batch is stirred for 4 hours at that temperature. The batch is then cooled to 80° C. and 125 parts by volume of thionyl chloride are added dropwise within 1 hour. Stirring is then continued for 1 hour at 75 to 80° C. The reaction mixture is then cooled to room temperature and discharged on to ice. The copper phthalocyanine-3′,3″,3‴,3⁗-tetrasulphonic acid chloride which precipitates is isolated by filtration and washed free from acid with ice-water.

The sulphochloride paste so obtained is mixed with 250 parts by volume of water and 250 parts of ice. 68.5 parts of N-phenyl-N,β-hydroxyethylamine, corresponding to a molar ratio of copper phthalocyanine-tetrasulphochloride to amine of 1:5, are added to the suspension and the batch is stirred for a few hours at room temperature and then for a further 24 hours at 30 to 40° C. The pH is maintained at 5 to 6 by the dropwise addition of a dilute soduim hydroxide solution. The batch is diluted with 500 parts by volume of water, the sulphonamide obtained is isolated by filtration, washed with water and dried in vacuo at 80° C.

140 parts of finely ground copper phthalocyanine-3′,3″,3‴,3⁗-tetrasulphonic acid-N - phenyl-N,β-hydroxyamide are dissolved at 0 to 5° C. in 500 parts of sulphuric acid monohydrate while stirring. The reaction mixture is stirred for 18 hours at the same temperature and then discharged on to 4000 parts of ice. Potassium chloride is added to the deep blue solution which forms and the dyestuff which precipitates is isolated by filtration. The strongly acidic paste is stirred in 1000 parts by volume of ice water, the solution obtained is neutralized with a sodium hydroxide solution, the dyestuff is precipitated by the addition of potassium chloride, isolated by filtration and dried in vacuo at 50° C. When dried, the new dyestuff of the formula

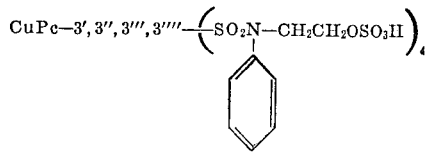

is in the form of a dark powder which dissolves readily in water to give a turquoise blue solution. It dyes wool a uniform, turquoise blue shade possessing very good fastness to washing, milling and perspiration and good fastness to light.

EXAMPLE 2

60 parts of copper phthalocyanine are introduced at room temperature into 312 parts by volume of chlorosulphonic acid within 15 minutes. The reaction mixture is stirred for 30 minutes at room temperature and then the temperature is raised to 130 to 135° C. within 2 hours. The batch is stirred at that temperature for 4 hours. The solution is cooled to room temperature and then discharged onto a mixture comprising 1000 parts of ice, 500 parts by volume of water and 280 parts of sodium chloride. The copper phthalocyanine-3′,3″,3‴,3⁗-monosulphonic acid-trisulphonic acid chloride that precipitates is isolated by filtration and washed with an ice-cold sodium chloride solution.

The sulphochloride paste so obtained is mixed with 250 parts by volume of water and 250 parts of ice. 55 parts of N-phenyl-N,β-hydroxyethylamine, corresponding to a molar ratio of CuPc-monosulphonic acid-trisulphonic acid chloride to amine of 1:4, are added to the suspension. The batch is then stirred for a few hours while its temperature rises from 0° C. to room temperature, and stirring is continued for a further 24 hours at 30 to 40° C. The pH is maintained at 5 to 7 by the dropwise addition of a dilute sodium hydroxide solution. The condensation product so obtained is isolated by filtration, washed with a dilute sodium chloride solution and dried in vacuo at 80° C.

125 parts of copper phthalocyanine-3′,3″,3‴,3⁗-monosulphonic acid-trisulphonic acid-N-phenyl-N,β-hydroxyethylamide are dissolved at 0 to 5° C. in 500 parts of sulphuric acid monohydrate while stirring. The reaction mixture is stirred for 18 hours at the same temperature, during which an olive-green solution is formed. The solution is discharged onto 4000 parts of ice, potassium chloride is added to the deep blue solution which forms, and the dyestuff which precipitates is isolated by filtration.

The paste, which is still strongly acidic, is mixed with 1000 parts by volume of ice-water, the solution formed is neutralized with dilute sodium hydroxide solution, the dyestuff is precipitated by the addition of potassium chloride, isolated by filtration and dried in vacuo at 50° C. When ground, the new dyestuff of the formula

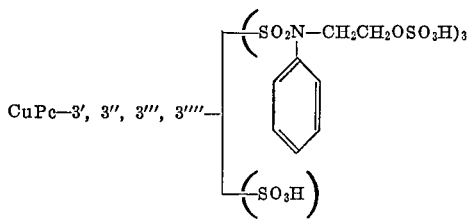

is in the form of a dark blue powder which is readily soluble in water. When applied in accordance with the dyeing procedure described herein, it dyes wool a full and pure turquoise blue shade possessing very good fastness to washing, milling and perspiration and good fastness to light.

Similar dyestuffs having equally good colouring properties may be obtained by condensing the polysulphochlorides listed in column I of the following table with the amines listed in column II by the methods described in the preceding examples and in the molar ratio (polysulphochloride:amine) shown in column III, and converting the sulphonamide intermediate products so obtained into the corresponding sulphatoester dyestuffs; the shades obtained on wool are indicated in column IV.

| I | II | III | IV |
|---|---|---|---|
| 1 ... CuPc-3',3'',3''',3''''-monosulphonic acid-trisulphonic acid chloride. | N-4-chlorophenyl-N,β-hydroxyethylamine | 1:3.5 | Turquoise blue. |
| 2 ... CuPc-3',3'',3''',3''''-tetrasulphonic acid chloride | N-benzyl-N,β-hydroxyethylamine | 1:5 | Do. |
| 3 ... NiPc-3',3'',3''',3''''-tetrasulphonic acid chloride | N-phenyl-N,β-hydroxyethylamine | 1:5 | Greenish blue. |
| 4 ... NiPc-3',3'',3''',3''''-monosulphonic acid-trisulphonic acid chloride. | N-4-chlorophenyl-N,β-hydroxyethylamine | 1:4 | Bluish green. |
| 5 ... CuPc-3',3'',3''',3''''-monosulphonic acid-trisulphonic acid chloride. | N-4-methylphenyl-N,β-hydroxyethylamine | 1:4 | Turquoise blue. |
| 6 ... do | N-4-nitrophenyl-N,β-hydroxyethylamine | 1:4 | Bluish green. |
| 7 ... do | N-2'-naphthyl-N,β-hydroxyethylamine | 1:4 | Turquoise blue. |
| 8 ... do | N-4-methoxyphenyl-N,β-hydroxyethylamine | 1:4 | Greenish turquoise blue. |
| 9 ... do | N-2,5-dimethylphenyl-N,β-hydroxyethylamine | 1:4 | Turquoise blue. |
| 10 ... do | 4-N,β-hydroxyethylaminodiphenyl | 1:3 | Do. |
| 11 ... do | N-2,5-diethoxyphenyl-N,β-hydroxyethylamine | 1:4 | Greenish turquoise blue. |
| 12 ... do | N-cyclohexyl-N,β-hydroxyethylamine | 1:3 | Turquoise blue. |

EXAMPLE 3

60 parts of copper phthalocyanine are converted in accordance with the process described in Example 2 into copper phthalocyanine-3',3'',3''',3''''-monosulphonic acid-trisulphonic acid chloride, which is then reacted with 27.4 parts of N-phenyl-N,β-hydroxyethylamine, corresponding to a molar ratio (polysulphochloride:amine) of 1:2. Sulphation of the condensation product yields a dyestuff of the formula

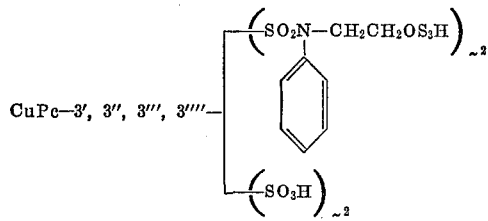

which dyes wool a somewhat more reddish turquoise blue compared with the shade produced by the dyestuff of Example 2.

EXAMPLE 4

The copper phthalocyanine-3',3'',3''',3''''-tetrasulphonic acid chloride prepared from 60 parts of copper phthalocyanine in accordance with the process described in Example 1 is reacted with 52.8 arts of N-benzyl-N,β-hydroxyethylamine, corresponding to a molar ratio (polysulphochloride:amine) of 1:3.5. Sulphation of the condensation product and working up produces a dyestuff of the formula

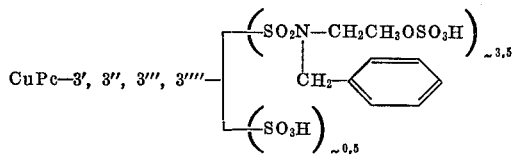

having tinctorial properties similar to those of the dyestuff obtained in accordance with the process described in Example 1.

EXAMPLE 5

90 parts of copper phthalocyanine-4',4'',4''',4''''-tetrasulphonic acid are converted in known manner into the corresponding tetrasulphonic acid chloride by reaction with chlorosulphonic acid and thionyl chloride. Condensation with 68.5 parts of N-phenyl-N,β-hydroxyethylamine, corresponding to a molar ratio (polysulphochloride:amine) of 1:5, and subsequent sulphation in highly concentrated sulphuric acid yields the dyestuff of the formula

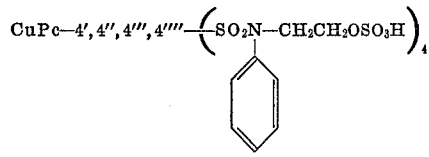

which dyes wool a greenish turquoise blue shade when applied according to the process described herein.

EXAMPLE 6

137 parts of N-phenyl-N,β-hydroxyethylamine are dissolved in 300 parts by volume of carbon tetrachloride. The solution is cooled to 0 to 3° C. and then 66 parts by volume of chlorosulphonic acid are added dropwise within 2 hours while stirring and cooling. The batch is stirred for 4 hours and the brownish precipitate which forms is isolated by filtration and washed free from acid with methanol. The product is recrystallized from alcohol and 130 parts of N-phenyl-N,β-sulphatoethylamine are obtained in the form of colourless needles melting at 203 to 205° C.

86.5 parts of the sulphation product so obtained are introduced into 300 parts by volume of ice-water and then a paste of 3',3'',3''',3''''-monosulphonic acid-trisulphonic acid chloride obtained in the usual manner from 60 parts of copper phthalocyanine is added. The suspension is stirred for a few hours while its temperature rises from 0° C. to room temperature and then stirring is continued for 24 hours at 35 to 45° C. A pH of 5 to 6 is maintained by the dropwise addition of dilute sodium hydroxide solution. A clear, deep blue solution is formed from which the dyestuff is precipitated by the addition of potassium chloride. The dyestuff is isolated by filtration, dried and ground, and corresponds with the dyestuff obtained in accordance with Example 2 in respect of composition and tinctorial behaviour.

Dyeing procedure 100 parts of wool knitting yarn are entered at 50 to 80° C. into a dyebath containing 10 parts of sodium sulphate crystals, 6 parts of 40% acetic acid, 0.5 part of the addition product derived from oleylamine and ethylene oxide as described below and 2 parts of the dyestuff described in Example 1 in 3000 parts of water. The dyebath is brought to the boil within 30 minutes and dyeing is carried out at the boil for one hour. The wool is then rinsed and dried. An even, turquoise blue dyeing is obtained.

Preparation of the ethylene oxide addition product 1 part of finely divided sodium is added to 100 parts of technical oleylamine, the batch is heated to 140° C. and then ethylene oxide is introduced at 135 to 140° C. As soon as rapid absorption of the ethylene oxide takes place, the reaction temperature is reduced to 120 to 125° C. and introduction of the ethylene oxide is continued until 113 parts have been taken up. The reaction product so obtained gives a practically clear solution in water.

I claim:
1. A phthalocyanine dyestuff of the formula

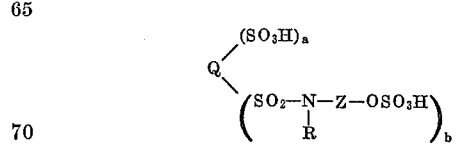

in which Q represents nickel or copper phthalocyanine, Z represents a low-molecular alkylene bridge that may be branched, R represents phenyl, chlorophenyl, bromophenyl, nitrophenyl, $C_{1-2}$-alkyl-phenyl, $C_{1-2}$-alkoxyphenyl, benzyl, naphthyl, or cyclohexyl and $a$ represents a number in the range of from 0 to 2, and in which $a+b$ must equal 4.

2. A phthalocyanine dyestuff as claimed in claim 1, in which Z represents a propylene, isopropylene or ethylene bridge.

3. A phthalocyanine dyestuff as claimed in claim 1 of the formula

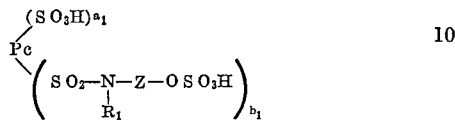

in which Pc represents nickel phthalocyanine or copper phthalocyanine, $Z_1$ represents an ethylene bridge, $R_1$ represents phenyl or benzyl, $a_1$ represents a number in the range of from 1 and 2, and in which $a_1+b_1$ must equal 4.

4. A phthalocyanine dyestuff as claimed in claim 1, in which Q represents copper phthalocyanine and $a$ is 1.

5. A phthalocyanine dyestuff of the formula

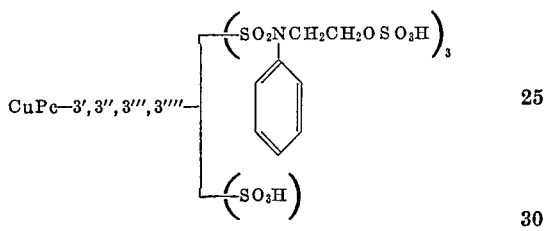

in which CuPc represents copper phthalocyanine.

6. A phthalocyanine dyestuff of the formula

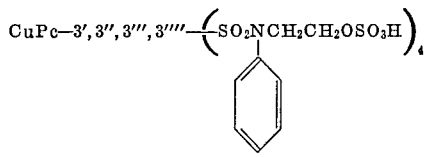

in which CuPc represents copper phthalocyanine.

7. A phthalocyanine dyestuff of the formula

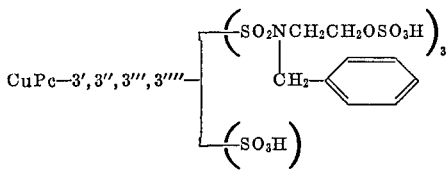

in which CuPc represents copper phthalocyanine.

8. A phthalocyanine dyestuff of the formula

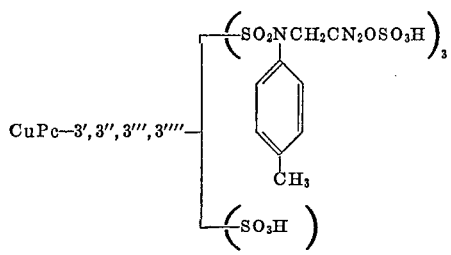

in which CuPc represents copper phthalocyanine.

9. A phthalocyanine dyestuff of the formula

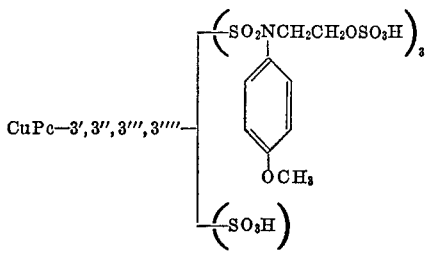

in which CuPc represents copper phthalocyanine.

References Cited
UNITED STATES PATENTS

| | | | |
|---|---|---|---|
| 3,268,549 | 8/1966 | Baier | 260—314.5 |
| 3,297,711 | 1/1967 | Remy | 260—314.5 |
| 3,535,333 | 10/1970 | Rudolf et al. | 260—314.5 |

HENRY R. JILES, Primary Examiner

S. D. WINTERS, Assistant Examiner

U.S. Cl. X.R.

260—577, 570.9, 563 C, 573; 8—178 R, 178 E, 54, 54.2 XA

PO-1050
(5/69)

UNITED STATES PATENT OFFICE    CASE 6562/E

CERTIFICATE OF CORRECTION

Patent No. 3,660,427             Dated May 2, 1972

Inventor(s) GERHARD BACK

It is certified that error appears in the above-identified patent and that said Letters Patent are hereby corrected as shown below:

Column 7, claim 3 in the formula, "Z" should be --- $Z_1$ ---.

Column 8, claim 8, "$(SO_2NCH_2CN_2OSO_3H)_3$" should be --- $(SO_2NCH_2CH_2OSO_3H)_3$ --- .

Signed and sealed this 13th day of March 1973.

(SEAL)
Attest:

EDWARD M. FLETCHER, JR.            ROBERT GOTTSCHALK
Attesting Officer                      Commissioner of Patents